US 10,800,887 B2

(12) United States Patent
Hueffer et al.

(10) Patent No.: US 10,800,887 B2
(45) Date of Patent: Oct. 13, 2020

(54) CROSS-LINKED POLYMERS, METHODS FOR THEIR MANUFACTURE, AND USE

(71) Applicant: BASF SE, Ludwigshafen am Rhein (DE)

(72) Inventors: Stephan Hueffer, Ludwigshafen (DE); Alejandra Garcia Marcos, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 141 days.

(21) Appl. No.: 16/300,093

(22) PCT Filed: May 4, 2017

(86) PCT No.: PCT/EP2017/060605
§ 371 (c)(1),
(2) Date: Nov. 9, 2018

(87) PCT Pub. No.: WO2017/194377
PCT Pub. Date: Nov. 16, 2017

(65) Prior Publication Data
US 2019/0153167 A1    May 23, 2019

(30) Foreign Application Priority Data

May 11, 2016    (EP) .................................... 16169100

(51) Int. Cl.
| C08G 77/455 | (2006.01) |
| C08G 65/26  | (2006.01) |
| C08G 73/02  | (2006.01) |
| C08G 77/452 | (2006.01) |

(52) U.S. Cl.
CPC ....... *C08G 77/455* (2013.01); *C08G 65/2624* (2013.01); *C08G 73/024* (2013.01); *C08G 73/0246* (2013.01); *C08G 77/452* (2013.01)

(58) Field of Classification Search
None
See application file for complete search history.

(56) References Cited

U.S. PATENT DOCUMENTS

| 4,247,592 A    | 1/1981  | Kalinowski |
| 5,556,616 A *  | 9/1996  | Janchitraponvej ....... A61K 8/39 424/70.11 |
| 5,648,186 A *  | 7/1997  | Daroux ................ C08G 65/324 429/308 |
| 5,756,080 A *  | 5/1998  | Janchitraponvej ....... A61K 8/39 424/70.11 |
| 6,300,304 B1 * | 10/2001 | Boeckh ................. C11D 3/3723 510/475 |
| 6,399,171 B1 * | 6/2002  | Merlin ..................... B32B 7/12 428/36.7 |
| 6,608,126 B2 * | 8/2003  | Ferritto ................. A61K 8/0295 524/266 |
| 6,794,042 B1 * | 9/2004  | Merlin .................. C08F 290/14 428/423.1 |
| 8,349,911 B2   | 1/2013  | Kuehnle |
| 8,937,142 B2 * | 1/2015  | Panandiker .............. C11D 1/62 528/27 |
| 2008/0004362 A1 * | 1/2008 | Masuda ............. C08G 18/4883 521/184 |
| 2013/0136712 A1 * | 5/2013 | Woo ..................... C11D 3/3769 424/76.1 |
| 2013/0259821 A1 | 10/2013 | Henning et al. |
| 2014/0243447 A1 | 8/2014  | Cho et al. |
| 2015/0008355 A1 | 1/2015  | Mund et al. |
| 2016/0355754 A1 * | 12/2016 | Somerville-Roberts .................... C11D 17/045 |
| 2019/0105416 A1 * | 4/2019 | Jing ....................... A01N 33/02 |

FOREIGN PATENT DOCUMENTS

| DE | 102010062676 A1 | 6/2012 |
| WO | WO-2009/014237 A2 | 1/2009 |
| WO | WO-2009/024386 A1 | 2/2009 |
| WO | WO-2013/110413 A1 | 8/2013 |

OTHER PUBLICATIONS

International Application No. PCT/EP2017/060605, International Search Report and Written Opinion, dated Sep. 13, 2017.

* cited by examiner

*Primary Examiner* — Robert S Loewe
(74) *Attorney, Agent, or Firm* — Marshall, Gerstein & Borun LLP

(57) ABSTRACT

Polymers bearing the following structural elements per molecule: (A) an average of at least two alkoxylated (poly) alkylenimine units, said alkylene being selected from $C_2$-$C_{10}$-alkylene and said alkoxylation being selected from ethoxylation, propoxylation, butoxylation and combinations of at least two of the foregoing, (B) at least one polysiloxane unit, and (C) at least one linkage connecting at least two different alkoxylated (poly)alkylenimine units (A) bearing at least one polysiloxane unit (B), each link-age (C) being selected from organic spacers bearing in the range of from 4 to 30 carbon atoms.

14 Claims, No Drawings

CROSS-LINKED POLYMERS, METHODS FOR THEIR MANUFACTURE, AND USE

CROSS-REFERENCE TO RELATED APPLICATIONS

This is the U.S. national phase of International Application No. PCT/EP2017/060605, filed May 4, 2017, which claims the benefit of European Patent Application No. 16169100.1, filed on May 11, 2016.

The present invention is directed towards polymers bearing the following structural elements per molecule:
(A) an average of at least two alkoxylated (poly)alkylenimine units, said alkylene being selected from $C_2$-$C_{10}$-alkylene and said alkoxylation being selected from ethoxylation, propoxylation, butoxylation and combinations of at least two of the foregoing,
(B) at least one polysiloxane unit, and
(C) at least one linkage connecting at least two different alkoxylated (poly)alkylenimine units (A) bearing at least one polysiloxane unit (B), each linkage (C) being selected from organic spacers bearing in the range of from 4 to 30 carbon atoms.

In these days, surface treatment such as hydrophobic modification is a field of broad commercial interest. With the help of suitable surface treatment agents surfaces may be modified. A particular desired property is a so-called silky touch. There are only very few versatile agents that allow to give a silky touch to surface types as different as textiles, leather, and lime.

Some authors suggest aminosiloxanes as surface treatment agent, for example DE 10 2010 062676, WO 2013/110413, and WO 2009/024386. However, aminosilxanes are difficult to be handled, and their synthesis is tedious. In addition, they need to be applied in emulsified form. This causes an additional step.

It was therefore an objective of the present invention to provide a surface treatment agent that allows to be used in various surface treatment processes for rendering a surface hydrophobic, and providing a silky touch. Such surface treatment agent should be easy to handle and storage stable.

Accordingly, the polymers defined at the outset have been found, hereinafter also referred to as inventive polymers or polymers according to the (present) invention.

In the context of the present invention the terms "(poly)alkylenimine" and "(poly)alkyleneimine units" may be used interchangeably.

Inventive polymers are characterized by structural elements (A), (B) and (C). Structural element (A) includes an average of at least two alkoxylated (poly)alkylenimine units, said alkylene being selected from $C_2$-$C_{10}$-alkylene and said alkoxylation being selected from ethoxylation, propoxylation, butoxylation and combinations of at least two of the foregoing.

In one embodiment of the present invention, said alkylenimine unit is a $C_2$-$C_{10}$-alkylendiamine unit, for example a 1,2-propylendiamine, preferably an α,ω-$C_2$-$C_{10}$-alkylendiamine, for example 1,2-ethylenediamine, 1,3-propylenediamine, 1,4-butylenediamine, 1,5-pentylenediaminne, 1,6-hexanediamine (also being referred to as 1,6-hexylendiamine), 1,8-diamine or 1,10-decandiamine, even more preferred are 1,2-ethylenediamine, 1,3-propylenediamine, 1,4-butylendiamine, and 1,6-hexanediamine.

In another embodiment of the present invention, said alkylenimine unit is a polyalkylenimine unit, preferably a polyethylenimine or polypropylenimine unit.

The term "polyethylenimine" in the context of the present invention does not only refer to poly-ethylenimine homopolymers but also to polyalkylenimines containing NH—$CH_2$—$CH_2$—NH structural elements together with other alkylene diamine structural elements, for example NH—$CH_2$—$CH_2$—$CH_2$—NH structural elements, NH—$CH_2$—$CH(CH_3)$—NH structural elements, NH—$(CH_2)_4$—NH structural elements, NH—$(CH_2)_6$—NH structural elements or (NH—$(CH_2)_8$—NH structural elements but the NH—$CH_2$—$CH_2$—NH structural elements being in the majority with respect to the molar share. Preferred polyethylenimines contain NH—$CH_2$—$CH_2$—NH structural elements being in the majority with respect to the molar share, for example amounting to 60 mol-% or more, more preferably amounting to at least 70 mol-%, referring to all alkylenimine structural elements. In a special embodiment, the term polyethylenimine refers to those polyalkylenimines that bear only one or zero alkylenimine structural element per polyethylenimine unit that is different from NH—$CH_2$—$CH_2$—NH.

The term "polypropylenimine" in the context of the present invention does not only refer to poly-propylenimine homopolymers but also to polyalkylenimines containing NH—$CH_2$—$CH(CH_3)$—NH structural elements together with other alkylene diamine structural elements, for example NH—$CH_2$—$CH_2$—$CH_2$—NH structural elements, NH—$CH_2$—$CH_2$—NH structural elements, NH—$(CH_2)_4$—NH structural elements, NH—$(CH_2)_6$—NH structural elements or (NH—$(CH_2)_8$—NH structural elements but the NH—$CH_2$—$CH(CH_3)$—NH structural elements being in the majority with respect to the molar share. Preferred polypropylenimines contain NH—$CH_2$—$CH(CH_3)$—NH structural elements being in the majority with respect to the molar share, for example amounting to 60 mol-% or more, more preferably amounting to at least 70 mol-%, referring to all alkylenimine structural elements. In a special embodiment, the term polypropylenimine refers to those polyalkylenimines that bear only one or zero alkylenimine structural element per polypropylenimine unit that is different from NH—$CH_2$—$CH(CH_3)$—NH.

Branches may be alkylenamino groups such as, but not limited to —$CH_2$—$CH_2$—$NH_2$ groups or $(CH_2)_3$—$NH_2$-groups. Longer branches may be, for examples, —$(CH_2)_3$—$N(CH_2CH_2CH_2NH_2)_2$ or —$(CH_2)_2$—$N(CH_2CH_2NH_2)_2$ groups. Highly branched polyethylenimines are, e.g., polyethylenimine dendrimers or related molecules with a degree of branching in the range from 0.25 to 0.95, preferably in the range from 0.30 to 0.80 and particularly preferably at least 0.5. The degree of branching can be determined for example by $^{13}$C-NMR or $^{15}$N-NMR spectroscopy, preferably in $D_2O$, and is defined as follows:

$$DB=D+T/D+T+L$$

with D (dendritic) corresponding to the fraction of tertiary amino groups, L (linear) corresponding to the fraction of secondary amino groups and T (terminal) corresponding to the fraction of primary amino groups.

Within the context of the present invention, branched polyethylenimine units are polyethylenimine units with DB in the range from 0.25 to 0.95, particularly preferably in the range from 0.30 to 0.90% and very particularly preferably at least 0.5. Preferred polyethylenimine units are those that exhibit little or no branching, thus predominantly linear or linear polyethylenimine units.

In the context of the present invention, $CH_3$-groups are not being considered as branches.

In one embodiment of the present invention polyalkylenimine units have a primary amine value in the range of from 1 to 1000 mg KOH/g, preferably from 10 to 500 mg KOH/g, most preferred from 50 to 300 mg KOH/g. The primary amine value can be determined according to ASTM D2074-07.

In one embodiment of the present invention polyalkylenimine units have a secondary amine value in the range of from 10 to 1000 mg KOH/g, preferably from 50 to 500 mg KOH/g, most preferred from 50 to 500 mg KOH/g. The secondary amine value can be determined according to ASTM D2074-07.

In one embodiment of the present invention polyalkylenimine units have a tertiary amine value in the range of from 1 to 300 mg KOH/g, preferably from 5 to 200 mg KOH/g, most preferred from 10 to 100 mg KOH/g. The tertiary amine value can be determined according to ASTM D2074-07.

In one embodiment of the present invention, the molar share of tertiary N atoms is determined by $^{15}$N-NMR spectroscopy. In cases that tertiary amine value and result according to $^{13}$C-NMR spectroscopy are inconsistent, the results obtained by $^{13}$C-NMR spectroscopy will be given preference.

In one embodiment of the present invention, the average molecular weight $M_w$ of said (poly)alkylenimine unit is in the range of from 250 to 100,000 g/mol, preferably up to 50,000 g/mol and more preferably from 800 up to 25,000 g/mol. The average molecular weight $M_w$ of polyalkylenimine units may be determined by gel permeation chromatography (GPC) of the intermediate respective polyalkylenimine, with 1.5% by weight aqueous formic acid as eluent and cross-linked poly-hydroxyethyl methacrylate as stationary phase.

Within a respective inventive polymer, (poly)alkylenimine units may be uniform or different, preferably they are uniform. In one embodiment of the present invention, all (poly)alkylenimine units of a specific inventive polymer are 1,2-propylendiamine, preferably an α,ω-$C_2$-$C_{10}$-alkylendiamine, for example 1,2-ethylenediamine, 1,3-propylenediamine, 1,4-butylenediamine, 1,5-pentylenediaminne, 1,6-hexanediamine (also being referred to as 1,6-hexylendiamine), 1,8-diamine or 1,10-decandiamine, even more preferred 1,2-ethylenediamine, 1,3-propylenediamine, 1,4-butylenediamine, or 1,6-hexanediamine.

In one embodiment of the present invention, all (poly)alkylenimine units of a specific inventive polymer are polyethylenimine units with a narrow molecular weight distribution, for example with a polydispersity $Q=M_w/M_n$ in the range of from 1 to 3.

In one embodiment of the present invention, all (poly)alkylenimine units of a specific inventive polymer are polypropylenimine units with a narrow molecular weight distribution, for example with a polydispersity $Q=M_w/M_n$ in the range of from 1 to 3, preferably at least 2.

In one embodiment of the present invention, all (poly)alkylenimine units of a specific inventive polymer are polyethylenimine units with a broad molecular weight distribution, for example with a polydispersity $Q=M_w/M_n$ in the range of from greater than 3 up to 15, preferably 3.5 to 8.

Said (poly)alkylenimine units (A) are alkoxylated, said alkoxylation being selected from ethoxylation, propoxylation, butoxylation and combinations of at least two of the foregoing. Preference is given to ethylene oxide, 1,2-propylene oxide and mixtures of ethylene oxide and 1,2-propylene oxide. If mixtures of at least two alkylene oxides are applied, they can be reacted step-wise or simultaneously.

In one embodiment of the present invention, an alkoxylated polyalkylenimine unit (A) bears at least 6 nitrogen atoms per unit.

In one embodiment of the present invention, (poly)alkylenimine is alkoxylated with 2 to 50 moles of alkylene oxide per NH group, preferably 5 to 30 moles of alkylene oxide per NH group, even more preferred 5 to 25 moles of ethylene oxide or 1,2-propylene oxide or combinations there-from per NH group. In the context of the present invention, an $NH_2$ unit is counted as two NH groups. Preferably, all—or almost all—NH groups are alkoxylated, and there are no detectable amounts of NH groups left.

Depending on the manufacture of such alkoxylated (poly)alkylenimine unit, the molecular weight distribution may be narrow or broad. For example, the polydispersity $Q=M_w/M_n$ in the range of from 1 to 3, preferably at least 2, or it may be greater than 3 and up to 20, for example 3.5 to 15 and even more preferred in the range of from 4 to 5.5.

In one embodiment of the present invention, the polydispersity Q of polyalkoxylated (poly)alkylenimine (A) is in the range of from 2 to 10.

In one embodiment of the present invention alkoxylated (poly)alkylenimine (A) is selected from poly-ethoxylated polyethylenimine, ethoxylated polypropylenimine, ethoxylated α,ω-hexanediamines, ethoxylated and propoxylated polyethylenimine, ethoxylated and propoxylated polypropylenimine, and ethoxylated and poly-propoxylated α,ω-hexanediamines.

In one embodiment of the present invention the average molecular weight $M_n$ (number average) of alkoxylated polyethylenimine units (A) is in the range of from 2,500 to 1,500,000 g/mol, determined by GPC, preferably up to 500,000 g/mol.

In one embodiment of the present invention, the average alkoxylated (poly)alkylenimine (A) are selected from ethoxylated α,ω-hexanediamines and ethoxylated and polypropoxylated α,ω-hexanediamines, each with an average molecular weight $M_n$ (number average) in the range of from 800 to 500,000 g/mol.

Inventive polymers further contain at least one polysiloxane unit (B), hereinafter also being referred to as unit (B). Polysiloxane unit (B) is preferably based—and introduced into inventive polymers—on an α,ω-dihydroxy polysiloxane, for example a unit of general formula

—[O—SiR$^1$R$^2$]$_n$—O— with all $R^1$ and $R^2$ being different or preferably identical and selected from $C_1$-$C_{10}$-alkyl, for example methyl, ethyl, n-propyl, isopropyl, n-butyl, isobutyl, sec.-butyl, n-hexyl, n-octyl and n-decyl, phenyl, benzyl and $C_5$-$C_8$-cycloalkyl.

Even more preferably, in inventive polymers all $R^1$ and $R^2$ are $CH_3$.

The variable n is selected from 5 to 100, preferably at least 10 and even more preferably 10 to 50.

In one embodiment of the present invention, said polysiloxane unit (B) bears at least 10 O—Si($R^1R^2$)- units, with $R^1$ and $R^2$ being different or preferably identical and selected from $C_1$-$C_{10}$-alkyl, phenyl, benzyl and $C_5$-$C_8$-cycloalkyl.

Polysiloxane unit (B) is linked to inventive polymer through a hydroxyl group of a polyalkylene oxide side chain.

Inventive polymers are formed by linking at least two different alkoxylated (poly)alkylenimine units through at least one linkage (C), each linkage (C) being selected from organic spacers bearing in the range of from 4 to 30 carbon atoms. Preferably, inventive polymers contain an average in the range of from 3 to 15 alkoxylated (poly)alkylenimine units (A) per molecule. Said (poly)alkylenimine units are then linked through linkages (C). In embodiments wherein the number of (poly)alkylenimine units per polymer molecule is 4 or greater such molecules may be linear of star-like.

Examples of linkages (C) are diester linkages, diether linkages, triester linkages, for example based on trimellitic acid, diurethane linkages, and triurethane linkages, for example based on the cyanuric acid derivative of (4,4'-diisocanatophenyl)methane or of hexamethylenediisocyanate.

In a preferred embodiment of the present invention linkage (C) is selected from a diester spacer and a diurethane spacer. Such spacers may be incorporated easily and with high yield.

Examples of diester linkages are aliphatic dicarboxylic acid diester spacers, cycloaliphatic dicarboxylic acid diester spacers and aromatic diester dicarboxylic acid spacers, hereinafter also referred to as aliphatic diester spacers, cycloaliphatic diester spacers and aromatic diester spacers, respectively.

Preferably, linkage (C) is selected from a terephthalic acid diester linkage, an isophthalic acid diester linkage, an adipic acid diester linkage, a cyclohexanedicarboxylic acid diester linkage, and a diurethane linkage based on toluylene diisocyanate, hexamethylene diisocyanate, and (4,4'-diisocyanatophenyl)methylene.

Cyclohexanedicarboxylic acid diester linkages may be selected from cis-1,2-cyclohexanedicarboxylic acid diester linkages, trans-1,2-cyclohexanedicarboxylic acid diester linkages, cis-1,3-cyclohexanedicarboxylic acid diester linkages, trans-1,3-cyclohexanedicarboxylic acid diester linkages, cis-1,4-cyclohexanedicarboxylic acid diester linkages, and trans-1,4-cyclohexanedicarboxylic acid diester linkages, and combinations of at least two of the foregoing, with cis-1,4-cyclohexanedicarboxylic acid diester linkages, trans-1,4-cyclohexanedicarboxylic acid diester linkages and combinations of cis-1,4-cyclohexanedicarboxylic acid diester linkages and trans-1,4-cyclohexanedicarboxylic acid diester linkages being preferred.

In one embodiment of the present invention, inventive polymers have an average molecular weight $M_w$ in the range of from 2,500 to 1,500,000 g/mol, determined by GPC, preferably from 3,000 to 500,000 g/mol and more preferably from 5,000 to 500,000 g/mol.

In one embodiment of the present invention, the polydispersity $Q=M_w/M_n$ of inventive polymers is in the range of from 2 up to 20, preferably 3 to 8.

In embodiments wherein a chlorine-containing reactant such as an acid chloride or any other reactant—with at least one chlorine atom per molecule—is used, and in embodiments wherein a chlorine-containing catalyst—with at least one chlorine atom per molecule—is used for the linking reaction in making inventive polymers the residual chlorine content may be in the range of from 100 ppm by weight to 0.1% by weight, referring to the inventive polymer.

In embodiments wherein neither chlorine-containing reactant such as an acid chloride or any other reactant—with at least one chlorine atom per molecule—nor a chlorine-containing catalyst—with at least one chlorine atom per molecule—is used for the linking reaction in making inventive polymers the residual chlorine content may be up to 10 ppm by weight, for example 1 to 8 ppm by weight, referring to the inventive polymer.

Inventive polymers have been found to be excellent demulsifyers, especially when applied to raw oil. When they are applied the step of demulsification does not take a lot of time, and a two-phase mixture is furnished that may be separated easily. A further aspect of the present invention therefore relates to the use of inventive polymers as demulsifyers, especially for crude oil. Another aspect of the present invention relates to a process for demulsifying crude oil by the use of at least one inventive polymer. It has further been found that inventive polymers are excellent dispersing agents, for example for pigments, and that they can be used as pigment dispersant in pigment preparations, for example for making ink-jet inks.

Another aspect of the present invention refers to a process for making inventive polymers, hereinafter also being referred to as inventive manufacturing process. The terms "making" and "manufacturing" are used interchangeably in the context of this invention.

The inventive manufacturing process comprises two steps,
  (a) providing an alkoxylated (poly)alkylenimine (A),
  (b) reacting said alkoxylated (poly)alkylenimine (A) with at least one α,ω-dihydroxy polysiloxane, and
  (c) reacting the product according to step (b) with at least one compound bearing at least two functional groups per molecule that are reactive towards alkanol groups.

Alkoxylated (poly)alkylenimines are known per se, and some of them may be obtained commercially. If desired, they may be synthesized, for example according to a process comprising the following steps:
  (a1) providing an amine or diamine and an initiator selected from $CO_2$, Brönsted acids and alkyl halides,
  (a2) adding one or more $C_2$-$C_{10}$-alkyleneimines, for example ethylenimine or propylenimine under polymerization conditions,
  (a3) reacting said one or more $C_2$-$C_{10}$-alkyleneimines,
  (a4) alkoxylation of the polyalkylenimine obtained after step (a3) with one or more alkylene oxides, selected from ethylene oxide, 1,2-propylene oxide, butylene oxide, and mixtures of at least two of the foregoing.

Examples of amines useful in step (a1) are selected from aliphatic monoamines. Specific examples are methylamine, dimethylamine, ethylamine, diethylamine, 1-propylamine, 2-propylamine. Examples of diamines are aliphatic and cycloaliphatic and aromatic diamines such as 1,2-diaminoethane, 1,3-diaminopropane, 1,4-diaminobutane, 1,6-diaminohexane, 1,8-diaminooctane, 3,3-dimethylaminopropylamine, isophoronediamine, 4,4'-diaminodiphenylmethane, 1,4-bis(3-aminopropyl)piperazine, 4,9-dioxadodecane-1,12-diamine, 4,7,10-trioxatridecane-1,13-diamine, and certain oligomers of ethylenediamine such as diethylenetriamine and triethylenetetramine. Preference is given to methylamine, dimethylamine, ethylamine, diethylamine, propylamine, 1,2-diaminoethane, diethylenetriamine, triethylenetetramine or 3,3-dimethylaminopropylamine, especially 1,2-diaminoethane (other term: ethylenediamine).

Suitable initiators added in step (a1) are carbon dioxide, Brönsted acids such as, but not limited to sulphuric acid, methanesulfonic acid, and organic acids such as formic acid, acetic acid, benzoic acid, and furthermore alkyl halide such as, but not limited to butyl chloride, for example n-chlorbutane and tert.-butyl chloride, the term alkyl halides also encompassing aliphatic dihalides such as 1,2-dichloroethane.

In one embodiment, in steps (a1) and (a2) from zero up to 50% by weight of water are used, referring to total aziridine, preferably up to 20% by weight.

In one embodiment, in steps (a1) and (a2) in the range of from 0.01 up to 10% by weight, preferably 0.5 up to 5% by weight of amine or diamine, respectively, are used, referring to total aziridine.

In one embodiment, in steps (a1) and (a2) in total from 10 ppm up to 10% by weight of $CO_2$, Brönsted acid or alkyl halide are used, referring to total aziridine, preferably 2 up to 8% by weight.

In step (a2), one or more $C_2$-$C_{10}$-alkyleneimines, for example ethylenimine or propylenimine is added. Non-limiting examples of optionally added substituted aziridine are 1-(2-hydroxyethyl)aziridine and 1-(2-aminoethyl)aziridine.

The addition according to step (a2) and the reaction according to step (a3) is performed under polymerization conditions. Polymerization conditions refer to a temperature in the range of from 60 to 200° C., preferably 88 to 180° C. The pressure is preferably in the range of from 1 to 50 bar, preferably 2 to 10 bar.

Preferably during step (a2) and (a3) neither further initiator nor further amine(s) are being added. Water is not added, either. The residual humidity of $C_2$-$C_{10}$-alkyleneimine, if any, is not counted as water addition in the context of the present invention.

In one embodiment of the present invention, the duration of steps (a2) and (a3) is in the range of from 2 to 30 hours, preferably at least 5 hours. The residual monomer content is preferably 1 ppm or less after completion of (a2). The residual comonomer content may be determined with 4-(para-nitrobenzyl)pyridine, according to the Preussmann Test, see von Preussmann et al., *Arzneimittelforschung* 1969, 19, 1059. The time ratio (a2)/(a3) may be in the range of from 10:1 to 1:10.

In a preferred embodiment of the present invention, synthesis of polyalkylenimine is performed in a tubular reactor combined with a semi-continuously operated tank reactor.

In step (a4), the polyalkylenimine resulting from step (a3) with one or more alkylene oxides, selected from ethylene oxide, 1,2-propylene oxide, butylene oxide, and mixtures of at least two of the foregoing.

In step (a), such polyalkylenimine may be provided in bulk or in solution, in bulk being preferred.

Step (a4) of the inventive two-step process comprises reacting the polypropylenimine provided in step (a3) with at least one $C_2$-$C_4$-alkylene oxide, for example ethylene oxide, propylene oxide, butylene oxide, or mixtures of at least two alkylene oxides of the foregoing. Preference is given to ethylene oxide, 1,2-propylene oxide and mixtures of ethylene oxide and 1,2-propylene oxide. If mixtures of at least two alkylene oxides are applied, they can be reacted stepwise or simultaneously.

Step (a4) of the inventive two-step process is carried out in the presence of a base. Suitable bases such as potassium hydroxide, sodium hydroxide, sodium or potassium alkoxides such as potassium methylate ($KOCH_3$), potassium tert-butoxide, sodium ethoxide and sodium methylate ($NaOCH_3$), preferably from potassium hydroxide and sodium hydroxide. Further examples of catalysts are alkali metal hydrides and alkaline earth metal hydrides such as sodium hydride and calcium hydride, and alkali metal carbonates such as sodium carbonate and potassium carbonate. Preference is given to the alkali metal hydroxides and the alkali metal alkoxides, particular preference being given to potassium hydroxide and sodium hydroxide. Typical use amounts for the base are from 0.05 to 10% by weight, in particular from 0.5 to 2% by weight, based on the total amount of polyalkylenimine and $C_2$-$C_4$-alkylene oxide.

In one embodiment of the present invention, step (a4) of the inventive two-step process is carried out at temperatures in the range of from 90 to 240° C., preferably from 120 to 180° C., in a closed vessel.

In one embodiment of the present invention, step (a4) of the inventive two-step process is carried out at a pressure in the range of from 1 to 10 bar, preferably 1 to 8 bar.

In one embodiment of the present invention, $C_2$-$C_4$-alkylene oxide(s) is/are introduced to polyalkylenimine and optionally to the catalyst under the vapour pressure of the alkylene oxide or of the respective mixture of $C_2$-$C_4$-alkylene oxides at the selected reaction temperature. $C_2$-$C_4$-Alkylene oxide(s) can be introduced in pure form or, as an alternative, be diluted up to 30 to 60% by volume with an inert gas such as a rare gas or nitrogen. This measure affords additional safety against explosion-like polyaddition of the $C_2$-$C_4$-alkylene oxide.

In case several $C_2$-$C_4$-alkylene oxides are being introduced polyether chains will be formed in which the different alkylene oxide units are distributed virtually randomly. Variations in the distribution of the units along the polyether chain can arise due to differing reaction rates of $C_2$-$C_4$-alkylene oxides. Variations in the distribution of the units along the polyether chain can be achieved arbitrarily by continuously introducing an alkylene oxide mixture of program-controlled composition as well. In case different $C_2$-$C_4$-alkylene oxides are reacted subsequently, then polyether chains with a block-type distribution of the alkylene oxide units are obtained.

In a preferred embodiment of the present invention, step (a4) can consist of two or more substeps, of which the first sub-step consists in initially undertaking only an incipient alkoxylation of polyalkylenimine. In the incipient alkoxylation, polyalkylenimine is reacted with a portion of the total amount of $C_2$-$C_4$-alkylene oxide used that corresponds to 0.9 to 1 mole of alkylene oxide per mole of NH moiety. The incipient alkoxylation is generally undertaken in the absence of a catalyst, preferably in an aqueous solution.

In one embodiment of the present invention, the incipient alkoxylation can be performed at a reaction temperature from 70 to 200° C., preferably from 80 to 160° C.

In one embodiment of the present invention, the incipient alkoxylation may be affected at a pressure of up to 10 bar, preferably up to 8 bar.

In a second sub-step and—optionally, in subsequent sub-steps—the further alkoxylation is then effected by subsequent reaction with $C_2$-$C_4$-alkylene oxide(s). The further alkoxylation is typically undertaken in the presence of a catalyst.

The second sub-step—and the optional subsequent sub-steps—may each be undertaken in bulk, embodiment (i), or in an organic solvent, embodiment (ii). In embodiment (i), water can be removed from the aqueous solution of the incipiently alkoxylated polyethylenimine (A). Such water removal can be done by heating to a temperature in the range of from 80 to 150° C. under a reduced pressure in the range of from 0.01 to 0.5 bar and distilling off the water.

In one embodiment of the present invention, the subsequent reaction with $C_2$-$C_4$-alkylene oxide(s) is effected typically at a reaction temperature in the range of from 70 to 200° C. and preferably from 100 to 180° C.

In one embodiment of the present invention, the subsequent reaction with $C_2$-$C_4$-alkylene oxide(s) is effected typically at a pressure of up to 10 bar and in particular up to 8 bar.

In one embodiment of the present invention, the reaction time of the subsequent reaction with $C_2$-$C_4$-alkylene oxide(s) is generally in the range of from 0.5 to 12 hours.

Examples of suitable organic solvents for embodiment (ii) are nonpolar and polar aprotic organic solvents. Examples of particularly suitable nonpolar aprotic solvents include aliphatic and aromatic hydrocarbons such as hexane, cyclohexane, toluene and xylene. Examples of particularly suitable polar aprotic solvents are ethers, in particular cyclic ethers such as tetrahydrofuran and 1,4-dioxane, furthermore N,N-dialkylamides such as dimethylformamide and dimethylacetamide, and N-alkyllactams such as N-methylpyrrolidone. It is as well possible to use mixtures of at least two of the above organic solvents. Preferred organic solvents are xylene and toluene.

In embodiment (ii), the solution obtained in the first step, before or after addition of catalyst and solvent, is dewatered before being subjected to alkylene oxide, said water removal advantageously being done by removing the water at a temperature in the range of from 120 to 180° C., preferably supported by a stream of nitrogen. The subsequent reaction with the alkylene oxide may be effected as in embodiment (i). In embodiment (i), the alkoxylated polyethylenimines (B) according to the invention is obtained directly in bulk and may be dissolved in water, if desired. In embodiment (ii), organic solvent is typically replaced by water. Alkoxylated polyethylenimines (A) may alternatively be isolated in bulk.

After step (a4) of the inventive two-step process alkoxylated polyalkylenimine (A) according to the invention is obtained.

In an analogous way, step (a4) may be performed with an $C_2$-$C_{10}$-alkylenimine as starting material, for example with 1,2-propylendiamine, preferably with an α,ω-$C_2$-$C_{10}$-alkylenediamine, for example 1,2-ethylenediamine, 1,3-propylenediamine, 1,4-butylenediamine, 1,5-pentylenediaminne, 1,6-hexanediamine (also being referred to as 1,6-hexylendiamine), 1,8-diamine or 1,10-decandiamine, even more preferred are 1,2-ethylenediamine, 1,3-propylenediamine, 1,4-butylenediamine, and 1,6-hexanediamine.

In step (b) of the inventive process, said alkoxylated (poly)alkylenimine (A) is reacted with at least one α,ω-dihydroxy polysiloxane.

In one embodiment of the present invention, step (b) of the inventive process is carried out at a temperature in the range of from 50 to 140° C., preferably from 50 to 120° C.

In one embodiment of the present invention, step (b) of the inventive process is carried out in the presence of a solvent, for example esters. Examples are di-butyladipate, for example di-n-butyladipate, and ethyl levulinate. A preferred example is ethyl acetate. In other embodiments, step (b) is carried out in bulk.

In one embodiment of the present invention, step (b) of the inventive process is carried out in the presence of a catalyst, for example a tertiary amine or a titanium tetraalkoxylate. Examples of suitable tertiary amines are triethyl amine and ethyl diisopropyl amine. Examples of suitable titanium tetraalkoxylates are $Ti(O\text{-}isoC_3H_7)_4$ and $Ti(OC_2H_5)_4$. In many embodiments, step (b) of the present invention does not require a catalyst.

In one embodiment of the present invention, the ratio of molar numbers of hydroxyl groups of polysiloxane units to polyalkylene oxide chains of alkoxylated (poly)alkylenimine (A) in step (b) is in the range of from 1:100 to 1:10.

Although it is possible to work up the product resulting from step (b) it is preferred to continue with step (c) by way of a one-pot reaction.

In step (c) of the inventive manufacturing process, product according to step (b) is reacted with at least one compound bearing at least two functional groups per molecule that are reactive towards alkanol groups.

In one embodiment of the present invention, alkanol groups product according to step (b) and functional groups that are reactive towards alkanol groups in said compound are in a molar ratio in the range of from 4:1 to 1:5, preferably 3:1 to 1:3, and even more preferably 2:1 to 1:2. An excess of functional groups may be advantageous to suppress internal crosslinking.

Examples of functional groups that are reactive towards alkanol groups are carboxyl groups, carboxylic acid anhydride groups, carboxylic acid halide groups, especially carboxylic acid chloride groups, and carboxylic ester groups, for example $C_1$-$C_{10}$-alkyl ester groups such as nonyl ester groups and 2-ethylhexyl groups, especially the respective ethyl ester and the methyl ester groups. Further examples of functional groups that are reactive towards alkanol groups are isocyanate groups. Most preferred are carboxylic acid methyl ester groups.

Examples of preferred compounds that may be used for introducing linkage (C) are the dimethyl esters and the diethyl esters of terephthalic acid, of isophthalic acid, of adipic acid, and of cyclohexanedicarboxylic acid, and the following diisocyanates: toluylene diisocyanate, hexamethylene diisocyanate, and (4,4'-diisocyanatophenyl)methylene.

Cyclohexanedicarboxylic acid dimethyl and diethyl esters may be selected from the respective esters of cis-1,2-cyclohexanedicarboxylic acid, trans-1,2-cyclohexanedicarboxylic acid, cis-1,3-cyclohexanedicarboxylic acid, trans-1,3-cyclohexanedicarboxylic acid, cis-1,4-cyclohexanedicarboxylic acid, and trans-1,4-cyclohexanedicarboxylic acid, and combinations of at least two of the foregoing, with cis-1,4-cyclohexanedicarboxylic acid, trans-1,4-cyclohexanedicarboxylic acid and combinations of cis-1,4-cyclohexanedicarboxylic acid and trans-1,4-cyclohexanedicarboxylic acid being preferred.

In embodiments of step (c) wherein diester linkages are made a catalyst may be applied, for example a Lewis acid. Examples of suitable Lewis acids are boron halides, for example, $BF_3$ etherate, aluminium trialkoxides such as, but not limited to $Al(OCH_3)_3$ and $Al[OCH(CH_3)_2]_3$, furthermore titanium tetraalkoxylates such as titanium tetraethoxylate and titanium tetraisopropoxide.

In a preferred embodiment of step (c) wherein diester linkages are made, a combination catalyst is applied, for example a combination of at least one of the above Lewis acids and an alkali metal salt of a carboxylic acid, for example a combination of a Lewis acid and sodium acetate or potassium acetate.

The amount of catalyst that is preferred is in the range of 0.01 to 10% by weight of catalyst, referring to the sum of product according to step (b) and compound bearing at least two functional groups per molecule that are reactive towards alkanol groups.

In embodiments of step (c) wherein a diurethane linkage is made the use of a catalyst is preferred. Preferred catalysts are tertiary amines, for example triethanolamine, trimethylamine, triethylamine, 1,4-diaza-[2,2,2]-tricyclooctane, and methyldihydrogenated tallow amine, in particular triethanolamine.

Step (c) may be performed in the presence of a solvent. In embodiments of step (c) wherein a diurethane linkage is formed the use of a solvent is preferred. A particularly preferred example of suitable solvents is ethyl acetate. A range of suitable concentrations of isocyanate in solvent is 1:10 to 1:5.

In other embodiments of step (c), especially in embodiments in which a diester linkage is made, no solvent is employed, and such steps (c) are performed in bulk.

Step (c) of the inventive manufacturing process may be performed under removal of byproducts, if applicable. For example, in embodiments wherein a carboxylic acid dichloride is employed, the HCl formed is advantageously removed in the presence of a base, for example an amine or sodium hydroxide. Methanol or ethanol formed in embodiments wherein carboxylic acid dimethyl or diethyl ester are used may be removed by distillation, for example with a Dean-Stark trap.

In one embodiment of the present invention, step (c) of the inventive manufacturing process is performed at a temperature in the range of from 20 to 200° C. In embodiments of step (c) in which a diester linkage is formed a temperature in the range of from 120 to 180° C. is preferred. In embodiments of step (c) in which a diurethane linkage is formed a temperature in the range of from 20 to 140° C. is preferred.

In one embodiment of the present invention, step (c) of the inventive manufacturing process is performed at a pressure in the range of from 3 mbar to 3 bar. Especially in embodiments of step (c) in which a diester linkage is formed a pressure below normal pressure is preferred in order to facilitate removal of alcohol. Formation of a diurethane linkage is preferably performed at normal pressure.

In one embodiment of the present invention, step (c) of the inventive manufacturing process is performed over a period of time in the range of from 30 minutes to 6 hours, preferably from 1 to 3 hours.

Inventive polymers and especially polymers obtained according to the inventive manufacturing process are excellently suitable as demulsifyers, especially for crude oil, and as pigment dispersant, especially in ink-jet inks. Another aspect of the present invention is thus the use of inventive polymers as demulsifyer, especially for the demulsification of crude oil, especially the demulsification of water-in-oil emulsions based on crude oil. Another aspect of the present invention is a process for demulsification of crude oil, especially of water-in-oil emulsions based on crude oil, by applying at least one inventive polymer. Another aspect of the present invention is a process for dispersing pigments and of making a pigment dispersion, especially for the use of an ink-jet ink, by using at least one inventive polymer.

Another aspect of the present invention is the use of inventive polymers for the manufacture of leather, especially for retanning. Another aspect of the present invention is a process for making leather by the use of at least one inventive polymers in the retanning step, said process also being refered to as inventive retanning process. Leather made by use of an inventive polymer are very soft and exhibit a good levelness, that is an even distribution of dyestuff(s).

For carrying out the retanning process according to the invention, semi-finished products tanned conventionally, i.e. for example with chrome tanning agents, mineral tanning agents, polymer tanning agents, aldehydes, syntans or resin tanning agents may be used as starting materials. For carrying out the retanning process according to the invention, at least one polymer according to the invention is allowed to act on semi-finished products, i.e. treatment with at least one polymer according to the invention is effected.

The retanning process according to the invention can be carried out under otherwise customary conditions. Expediently, one or more, i.e. from 2 to 6, treatment steps are chosen and washing with water can be effected between the treatment steps. The temperature at the individual treatment steps is in each case from 5 to 60° C., preferably from 20 to 45° C. Expediently, one or more further compositions usually used during the retanning are employed, for example fatliquors, polymer tanning agents and acrylate- and/or methacrylate-based fatliquoring agents, retanning agents based on vegetable tanning agents, fillers, leather dyes or emulsifiers.

A duration of from 10 minutes to 12 hours has proven useful for the retanning process according to the invention, and from one to three hours are preferred. The retanning process according to the invention can be carried out in any desired vessels customary in tanning, for example by drumming in barrels or in rotated drums.

In one embodiment of the retanning process according to the invention, altogether from 0.01 to 10% by weight of polymer according to the invention, based on the shaved weight on the other hand, are used, and from 0.5 to 5% by weight are preferred.

Inventive polymers and especially polymers obtained according to the inventive manufacturing process are excellently suitable as additive in hard surface cleaners and for coating of bricks and concrete. Another aspect of the present invention is thus the use of inventive polymers as additive in a hard surface cleaner. Another aspect of the present invention is thus the use of inventive polymers as a coating for concrete or bricks. Preferably, about one to 200 g of inventive polymer or polymer according to the inventive manufacturing process are applied per square meter. The application may be performed by impregnating or spraying or with a roller blade.

In addition, inventive polymers and especially polymers obtained according to the inventive manufacturing process are excellently suitable for textile manufacturing including non-wovens, cosmetic applications, and laundry care applications including home care and industrial and institutional laundry care.

Another aspect of the present invention is directed towards the use of inventive polymers for the manufacture or treatment of textile, herein jointly referred to as inventive textile treatment method. Textiles that may be manufactured or treated with polymers according to the present invention are exemplified by (i) natural fibers such as cotton, flax, silk and wool; (ii) synthetic fibers such as polyester, polyamide, polyacrylonitrile, polyethylene, polypropylene and polyurethane; and (iii) inorganic fibers such as glass fiber and carbon fiber. Preferably, the inventive textile treatment method is applied to a fabric produced from any of the above-mentioned fibrous materials or blends thereof. Most preferably, the textile is a cotton-containing fabric such as cotton or a cotton-polyester blend.

The inventive textile treatment method may be performed, for example, by impregnating, spraying, soaking, brushing, rinsing, dipping and padding. After the actual treatment step, optional steps are rinsing and/or thermal after-treatment. Said thermal after-treatment may be effected in a drying oven or with hot steam.

The present invention is further illustrated by the following working examples.

WORKING EXAMPLES

General remarks:

Percentages refer to % by weight unless specifically defined otherwise.

I. Manufacture of polyethylenimines

I.1 Synthesis by polymerization

General remarks: the syntheses were performed in a continuously operated tubular reactor, length 18 m, inner diameter 3.5 mm. Said tubular reactor had two reaction zones. In the first reaction zone the temperature was kept at 125 to 130° C., in the second at 150° C. The first reaction zone was in the first 12 m, the second reaction zone in the remaining 6 m of the tubular reactor. The pressure was kept at 0.5 bar above the pressure necessary to keep the reaction mixture liquid, which requires a minimum of 1.5 bar.

Step (a1) was performed in a so-called mixing chamber, in which water, ethylenimine, aqueous $CO_2$ solution, and ethylenediamine were mixed through three static mixers. The mixture so obtained was then transferred into the tubular reactor.

The following starting materials were used:

Aziridine, provided as 25 wt. % aqueous solution $CO_2$ as 2.5 wt. % aqueous solution 1,2-ethylenediamine I.1.1 Synthesis of polyethylenimine (PEI.1)

A 2-litre reactor with plate heat exchanger, was charged with 88 g 1,2-ethylenediamine and 27 g $CO_2$ (as dry ice). A 60% by weight aqueous solution of aziridine was fed at a rate of 270 g/h. Through exothermic primary polymerization the temperature rose to 140° C. The temperature was maintained at 140° C. In total, an amount of 980 g of the aziridine solution were added. After the addition had been completed the reaction mixture was stirred for another two hours at 145° C.

Then the reaction was stopped by cooling to ambient temperature and pressure release. The water was removed, and polyethylenimine (PEI.1) was obtained.

I.1.2 Synthesis of polyethylenimine (PEI.2)

A premix was provided from $CO_2$ as 2.5 wt. % aqueous solution and 1,2-ethylenediamine. The tubular reactor described above was fed with a 360 g/h 25 wt. % aqueous solution of aziridine and the above premix in a way that a feed resulted in the addition of 17 g/h 2.5 wt. % aqueous solution of $CO_2$ and 6.2 g/h 1,2-ethylenediamine were introduced into the tubular reactor. The feed had a temperature of 5° C. at the time of mixing. Through exothermic primary polymerization the temperature rose to 80 to 160° C. when entering the first reaction zone. At the end of the tubular reactor, the pressure was adjusted to 5 bar. The conversion of aziridine in the tubular reactor was 99 mol-%.

After having passed the tubular reactor, the reaction mixture was transferred into a semicontinuously operated tank reactor operated at 160° C. There, the polymerization was completed, step (a3). The average residence time was 2.5 hours in the stirred tank reactor hours. When the tank reactor was full the reaction was stopped by cooling to ambient temperature and pressure release. The water was removed, and polyethylenimine (PEI.2) was obtained.

I.1.3 Synthesis of polyethylenimine (PEI.3)

A 2-litre reactor with plate heat exchanger, was charged with 41.8 g 1,2-ethylenediamine and 14.2 g $CO_2$ (as dry ice). A 60% by weight aqueous solution of aziridine was fed at a rate of 250 g/h. Through exothermic primary polymerization the temperature rose to 140° C. The temperature was maintained at 140° C. In total, an amount of 1 kg of the aziridine solution were added. After the addition had been completed the reaction mixture was stirred for another two hours at 145° C.

Then the reaction was stopped by cooling to ambient temperature and pressure release. The water was removed, and polyethylenimine (PEI.3) was obtained.

The polyethylenimines (PEI) provided are summarized in Table 1.

TABLE 1

Polyethylenimines and their properties

| | $M_w$ [g/mol] | $M_n$ [g/mol] | $M_w/M_n$ | Amine value |
|---|---|---|---|---|
| (PEI.1) | 880 | 620 | 1.42 | 20.5 |
| (PEI.2) | 28,000 | 6,800 | 4.1 | 15.3 |
| (PEI.3) | 2,000 | 1,150 | 1.74 | 17.3 |

All molecular weights were determined by GPC with 1.5% by weight aqueous formic acid as eluent and cross-linked poly-hydroxyethylmethacrylate as stationary phase. Internal standard was a 0.05% by weight solution of tert.-butanol in 1.5% by weight aqueous formic acid. The column was calibrated with the help of pullulan ($\alpha$-1,4-;$\alpha$-1,6-glucan) samples with known molecular weight. In Table 1, the amine value is the primary amine value.

II. Syntheses of alkoxylated polyethylenimines (A)

II.1 Synthesis of "mono-alkoxylates"

II.1.1 Synthesis of mono-ethoxylate 1

A 2-l autoclave was charged with 645 g of polyethylenimine (PEI.1) and 32 g of water and then purged with nitrogen. Then, the autoclave was heated to 90° C. An amount of 595 g of ethylene oxide was added within 10 hours under stirring and allowed to react for additional 12 hours at 90° C. The mixture so obtained was cooled to 80° C., and the volatile ingredients were removed in vacuo. An amount of 1,235 g of a highly viscous yellow liquid, "mono-ethoxylate 1" was obtained.

II.1.2 Synthesis of mono-propoxylate 2

A 2-l autoclave was charged with 323 g of polyethylenimine (PEI.1) and 16 g of water and then purged with nitrogen. Then, the autoclave was heated to 90° C. An amount of 384 g of propylene oxide was added within 10 hours under stirring and allowed to react for additional 12 hours at 90° C. The mixture so obtained was cooled to 80° C., and the volatile ingredients were removed in vacuo. An amount of 692 g of a highly viscous yellow liquid, "mono-propoxylate 2" was obtained.

II.1.3 Synthesis of mono-ethoxylate 3

A 2-l autoclave was charged with 520 g of polyethylenimine (PEI.2) and 15.5 g of water and then purged with nitrogen. Then, the autoclave was heated to 90° C. An amount of 350 g of ethylene oxide was added within 10 hours under stirring and allowed to react for additional 12 hours at 90° C. The mixture so obtained was cooled to 80° C., and the volatile ingredients were removed in vacuo. An amount of 859 g of a highly viscous yellow liquid, "mono-ethoxylate 3" was obtained.

II.1.4 Synthesis of mono-ethoxylate 4

A 2-l autoclave was charged with 340 g of polyethylenimine (PEI.3) and 15.5 g of water and then purged with nitrogen. Then, the autoclave was heated to 90° C. An amount of 257 g of ethylene oxide was added within 10 hours under stirring and allowed to react for additional 12 hours at 90° C. The mixture so obtained was cooled to 80°

C., and the volatile ingredients were removed in vacuo. An amount of 601 g of a highly viscous yellow liquid, "monoethoxylate 4" was obtained.

II.1.5 Synthesis of mono-propoxylate 5

A 2-l autoclave was charged with 280 g of polyethylenimine (PEI.3) and 12 g of water and then purged with nitrogen. Then, the autoclave was heated to 90° C. An amount of 278 g of propylene oxide was added within 10 hours under stirring and allowed to react for additional 12 hours at 90° C. The mixture so obtained was cooled to 80° C., and the volatile ingredients were removed in vacuo. An amount of 551 g of a highly viscous yellow liquid, "monopropoxylate 5" was obtained.

II.2 Alkoxylations

II.2.1 Synthesis of alkoxylated polyethylenimine (A.1)

A 2-l autoclave was charged with 330 g of mono-ethoxylate 1 and 5.6 g of a 50% by weight aqueous KOH solution. The water was removed at 20 mbar. Then, the autoclave was purged with nitrogen and subsequently heated to 120° C. Within 12 hours, 780 g of ethylene oxide were added under stirring and allowed to react for additional 12 hours at 120° C. The mixture so obtained was cooled to 80° C., and the volatile ingredients were removed in vacuo. An amount of 1,106 g of a light brown solid was obtained that was alkoxylated polyethylenimine (A.1).

II.2.2 Synthesis of alkoxylated polyethylenimine (A.2)

A 2-l autoclave was charged with 105 g of mono-ethoxylate 1 and 2.0 g of a 50% by weight aqueous KOH solution. The water was removed at 20 mbar. Then, the autoclave was purged with nitrogen and subsequently heated to 120° C. Within 12 hours, 998 g of ethylene oxide were added under stirring and allowed to react for additional 12 hours at 120° C. The mixture so obtained was cooled to 80° C., and the volatile ingredients were removed in vacuo. An amount of 1,100 g of a light brown solid was obtained that was alkoxylated polyethylenimine (A.2).

II.2.3 Synthesis of alkoxylated polyethylenimine (A.3)

A 2-l autoclave was charged with 152 g of monopropoxylate 2 and 2.8 g of a 50% by weight aqueous KOH solution. The water was removed at 20 mbar. Then, the autoclave was purged with nitrogen and subsequently heated to 120° C. Within 12 hours, 963 g of propylene oxide were added under stirring and allowed to react for additional 12 hours at 120° C. The mixture so obtained was cooled to 80° C., and the volatile ingredients were removed in vacuo. An amount of 1,085 g of a light brown liquid was obtained that was alkoxylated polyethylenimine (A.3).

II.2.4 Synthesis of alkoxylated polyethylenimine (A.4)

A 2-l autoclave was charged with 124 g of mono-ethoxylate 1 and 2.7 g of a 50% by weight aqueous KOH solution. The water was removed at 20 mbar. Then, the autoclave was purged with nitrogen and subsequently heated to 120° C. Within 12 hours, 530 g of ethylene oxide were added under stirring and allowed to react for additional 12 hours at 120° C. Then, 618 g of propylene oxide were added under stirring within 12 hours and allowed to react for additional 12 hours at 120° C. The mixture so obtained was cooled to 80° C., and the volatile ingredients were removed in vacuo. An amount of 1,265 g of a yellow liquid was obtained that was alkoxylated polyethylenimine (A.4).

II.2.5 Synthesis of alkoxylated polyethylenimine (A.5)

A 2-l autoclave was charged with 76 g mono-ethoxylate 1 and 2.0 g of a 50% by weight aqueous KOH solution. The water was removed at 20 mbar. Then, the autoclave was purged with nitrogen and subsequently heated to 120° C. Within 12 hours, 605 g of ethylene oxide were added under stirring and allowed to react for additional 12 hours at 120° C. Then, 565 g of propylene oxide were added under stirring within 12 hours and allowed to react for additional 12 hours at 120° C. The mixture so obtained was cooled to 80° C., and the volatile ingredients were removed in vacuo. An amount of 1,244 g of a yellow liquid was obtained that was alkoxylated polyethylenimine (A.5).

II.2.6 Synthesis of alkoxylated polyethylenimine (A.6)

A 2-l autoclave was charged with 321 g of mono-ethoxylate 5 and 5.6 g of a 50% by weight aqueous KOH solution. The water was removed at 20 mbar. Then, the autoclave was purged with nitrogen and subsequently heated to 120° C. Within 12 hours, 830 g of ethylene oxide were added under stirring and allowed to react for additional 12 hours at 120° C. The mixture so obtained was cooled to 80° C., and the volatile ingredients were removed in vacuo. An amount of 1,148 g of a light brown solid was obtained that was alkoxylated polyethylenimine (A.6).

II.2.7 Synthesis of alkoxylated polyethylenimine (A.7)

A 2-l autoclave was charged with 155 g of mono-ethoxylate 5 and 2.6 g of a 50% by weight aqueous KOH solution. The water was removed at 20 mbar. Then, the autoclave was purged with nitrogen and subsequently heated to 120° C. Within 12 hours, 1,411 g of ethylene oxide were added under stirring and allowed to react for additional 12 hours at 120° C. The mixture so obtained was cooled to 80° C., and the volatile ingredients were removed in vacuo. An amount of 1,565 g of a light brown solid was obtained that was alkoxylated polyethylenimine (A.7).

II.2.8 Synthesis of alkoxylated polyethylenimine (A.8)

A 2-l autoclave was charged with 175 g of monopropoxylate 6 and 2.9 g of a 50% by weight aqueous KOH solution. The water was removed at 20 mbar. Then, the autoclave was purged with nitrogen and subsequently heated to 120° C. Within 12 hours, 1,338 g of propylene oxide were added under stirring and allowed to react for additional 12 hours at 120° C. The mixture so obtained was cooled to 80° C., and the volatile ingredients were removed in vacuo. An amount of 1,512 g of a light brown solid was obtained that was alkoxylated polyethylenimine (A.8).

II.2.9 Synthesis of alkoxylated polyethylenimine (A.9)

A 2-l autoclave was charged with 290 g of mono-ethoxylate 3 and 5.3 g of a 50% by weight aqueous KOH solution. The water was removed at 20 mbar. Then, the autoclave was purged with nitrogen and subsequently heated to 120° C. Within 12 hours, 680 g of ethylene oxide were added under stirring and allowed to react for additional 12 hours at 120° C. The mixture so obtained was cooled to 80° C., and the volatile ingredients were removed in vacuo. An amount of 979 g of a light brown solid was obtained that was alkoxylated polyethylenimine (A.9).

II.2.10 Synthesis of alkoxylated polyethylenimine (A.10)

A 2-l autoclave was charged with 185 g of mono-ethoxylate 3 and 3.9 g of a 50% by weight aqueous KOH solution. The water was removed at 20 mbar. Then, the autoclave was purged with nitrogen and subsequently heated to 120° C. Within 12 hours, 878 g of ethylene oxide were added under stirring and allowed to react for additional 12 hours at 120° C. The mixture so obtained was cooled to 80° C., and the volatile ingredients were removed in vacuo. An amount of 1,068 g of a light brown solid was obtained that was alkoxylated polyethylenimine (A.10).

TABLE 2

Summary of properties of alkoxylated polyethylenimines (A.1) to (A.10)

| Entry | Amine | AO | moles AO/N—H | $M_n$ (A) [g/mol] |
|---|---|---|---|---|
| (A.1) | PEI.1 | EO | 6 | 3,300 |
| (A.2) | PEI.1 | EO | 20 | 12,700 |
| (A.3) | PEI.1 | PO | 12 | 10,600 |
| (A.4) | PEI.1 | EO, PO | 10, 8 | 12,400 |
| (A.5) | PEI.1 | EO, PO | 18, 12 | 20,100 |
| (A.6) | PEI.3 | EO | 7 | 7,700 |
| (A.7) | PEI.3 | EO | 22 | 24,200 |
| (A.8) | PEI.3 | PO | 16 | 18,050 |
| (A.9) | PEI.2 | EO | 6 | 39.200 |
| (A.10) | PEI.2 | EO | 10 | 58.000 |

Explanations with respect to Table 2:
AO: alkylene oxide,
EO: ethylene oxide,
PO: propylene oxide

III. Crosslinking Reactions

General procedure for urethane linking

A four-necked 1-litre flask with stirrer, thermometer and condenser for distillation was charged with 200 g of (A) according to table 3 and heated to 35° C. 50 g of ethyl acetate and the appropriate amount of component (C) (see table 3) were added under stirring. Then a 50% solution of toluenediisocyanate (TDI) or hexamethylenediisocyanate (HMDI) according to Table 3 were added dropwise within 20 minutes (stirring). The temperature was increased to 120° C. within 30 minutes and the mixture was stirred at for another 90 minutes while ethyl acetate was distilled off. Then, 100 ml water were added at 90° C., the reaction mixture was stirred for 15 minutes and finally, volatile ingredients were removed by rotary evaporation at 60° C. and 10 mbar.

TABLE 3 crosslinking reactions and properties of inventive polymers

| polymer (B) | (A) | α,ω-hydroxy polysiloxane | molar ratio (A)/(B)/C | average number of units A |
|---|---|---|---|---|
| (P.1) | TDI | (A.1) | 1 | 1/0.7/0.3 | 3.9 |
| (P.2) | HMDI | (A.2) | 1 | 1/0.6/0.3 | 3.1 |
| (P.3) | HMDI | (A.3) | 1 | 1/0.6/0.3 | 2.9 |
| (P.4) | TDI | (A.4) | 1 | 1/0.7/0.3 | 3.5 |
| (P.5) | TDI | (A.4) | 2 | 1/1/0.45 | 5.1 |
| (P.6) | TDI | (A.5) | 2 | 1/0.5/0.25 | 2.9 |
| (P.7) | TDI | (A.5) | 2 | 1/0.8/0.3 | 4.5 |
| (P.8) | TDI | (A.6) | 2 | 1/0.5/0.25 | 2.9 |
| (P.9) | TDI | (A.6) | 1 | 1/1/0.35 | 4.1 |
| (P.10) | TDI | (A.7) | 2 | 1/0.8/0.3 | 3.0 |
| (P.11) | DMT | (A.8) | 1 | 1/0.5/0.2 | 2.4 |
| (P.12) | DMT | (A.9) | 1 | 1/0.6/0.25 | 3.1 |
| (P.13) | DMT | (A.10) | 1 | 1/0.5/0.25 | 2.8 |

α,ω-dihydroxy polysiloxane 1: $M_n$ 2,500 g/mole, dynamic viscosity η at 25° C.: 500 mPa·s α,ω-dihydroxy polysiloxane 2: $M_n$ 5,000 g/mole, dynamic viscosity η at 25° C.: 2500 mPa·s

IV. Application Examples

IV. 1 Retannage of leather, use in the retanning of leather—production of upper leather The data in % by weight are based in each case on the shaved weight, unless stated otherwise.

Two commercial cattle wet-blues including flanks (from Packer, USA) were shaved to a thickness of 1.7 to 1.9 mm and cut into seven strips of about 700 g each. 1.5% by weight of sodium formate and 0.5% by weight of $NaHCO_3$ and 1% by weight of a naphthalenesulfonic acid/formaldehyde condensate, prepared according to U.S. Pat. No. 5,186,846, example entitled "Dispersant 1", were then added to the strips in a drum (50 l) and with a liquor length of 200% by weight with an interval of 10 minutes. After 70 minutes, the liquor was discharged. The strips were then distributed over 7 separate drums for drumming.

Thereafter, as stated in table 4, 100% of water, 2% by weight of a 40% by weight solids content aqueous solution of polyacrylic acid, $M_n$ 70,000 g/mol, pH: 5.5, and 4% by weight of inventive polymer according to table 4 were added and the mixtures were drummed for 30 minutes. Thereafter, 2% by weight each of sulfone tanning agent from EP-B 0 459 168, example K1, and 3% by weight each of vegetable tanning agent Mimosa® and 2% by weight each of a 40% strength by weight (solids content) aqueous solution of dyes, whose solids had the following composition, was metered into drums 1 to 7 at from 25 to 35° C.: 70 parts by weight of dye from EP-B 0 970 148, example 2.18, 30 parts by weight of Acid Brown 75 (iron complex), Colour Index 1.7.16, and drumming was effected for 30 minutes.

Acidification was then effected with formic acid to a pH of 3.9 to 4.1 in several steps. After additional 20 minutes of drumming, the leathers were then washed with 200% by weight of water. Finally, 3% by weight of a fatliquoring agent, which was prepared as described under IV.2, were metered into 100% of water at 50° C. After a drumming time of 45 minutes, acidification to pH 3.7 was effected with 1% by weight of formic acid. The washed leathers so obtained were dried and staked.

The leathers (L.1) to (L12) had excellent body, softness and handle in combination with outstanding dye penetration of the fibers.

TABLE 2

Performance characteristics of leathers L.1 to L-12 and comparative leathers C-(L.6) and C-(L.7)

| Leather | Copolymer | Body | Softness | Grain tightness | Body bend/flank | Dye penetration | Levelness of dyeing |
|---|---|---|---|---|---|---|---|
| (L.1) | (P.1) | 1 | 2 | 1 | 1.5 | 1 | 2 |
| (L.2) | (P.2) | 1.5 | 1.5 | 2 | 2.5 | 1.5 | 1 |
| (L.5) | (P.5) | 2 | 1.5 | 1 | 1.5 | 1.5 | 1 |
| (L.9) | (P.9) | 1.5 | 2 | 2 | 2 | 2 | 1.5 |
| (L.12) | (P.12) | 1 | 2 | 1 | 1 | 2 | 2 |

TABLE 2-continued

Performance characteristics of leathers L.1 to L-12 and comparative leathers C-(L.6) and C-(L.7)

| Leather | Copolymer | Body | Softness | Grain tightness | Body bend/flank | Dye penetration | Levelness of dyeing |
|---------|-----------|------|----------|-----------------|-----------------|-----------------|---------------------|
| C-(L.6) | None      | 3    | 3.5      | 2.5             | 3               | 3               | 3.5                 |
| C-(L.7) | (A.2)     | 2.5  | 2.5      | 2               | 3               | 2.5             | 2.5                 |

Remarks:

The evaluation of body, grain tightness, softness, penetration and levelness of dyeing was effected according to a rating system from 1 (very good) to 5 (poor).

IV. 2 Manufacture of a fatliquoring agent

The following were mixed in a 2 l kettle:

230 g of a polyisobutene having $M_n$=1 000 g/mol and $M_w$=1 800 g/mol 30 g of n-$C_{18}H_{37}O$—$(CH_2CH_2)_{25}$—OH 5 g of n-$C_{18}H_{37}O$—$(CH_2CH_2O)80$—OH 40 g of oleic acid 230 g of sulfited oxidized triolein The mixture was heated to 60° C. with stirring, and 470 g of water and 10 g of n-C16H33O—$(CH_2CH_2O)_7$—OH were added. The resulting emulsion was then passed through a gap homogenizer. A finely divided, stable emulsion was obtained.

V. Treatment of Textiles with Inventive Copolymers

Parts refer to parts by weight unless specifically noted otherwise.

All inventive polymers were self-dispersing in water. No additional surfactant was used for dispersing inventive polymers in water.

The textiles were tested in accordance with ASTM Method D-1776-79, natural cotton. As test textiles, untreated terry towels from Möve Frottana Textil GmbH & Co. KG, D-02779 Großschönau, were used. Either 0.5% by weight or 1.0% by weight, see table 5, of inventive polymer as a were applied to a terry towel by padding, followed by drying for 3 hours at 40 to 50° C.

For comparative purposes, an aminofunctional silicone according to U.S. Pat. No. 4,247,592, example 1, was emulsified with 3.6 parts n-C15-alkyl-(EO)15 and 2.4 parts n-C15-alkyl-(EO)3 and 12 parts water to form a premix. The premix was placed in the feeder and passed through a Homogenizer Type 15M from Manton-Graulin Mfg. Co., Inc. (Evert, Mass.) at 210 bar. Additional 48 parts of water were added slowly to the homogenizer feeder, and the resultant mixture was passed twice through the homogenizer at 210 bar. The emulsion contained 40 parts of aminopolysiloxane to 60 parts water. For the inventive species the preparation of a pre-emulsion is not necessary.

Softness and/or amine-like hand evaluations were performed by a hand panel. For the softness evaluation, textiles were rated using a 1-to-10 scale on which scale, 1 was the softest and 10 was the harshest value.

TABLE 5

Inventive polymers in textile treatment

| textile | polymer | Softness 0.5% | Softness 1.0% | Touch 1.0% | Self dispersing yes/no | Water takeup [s] |
|---------|---------|---------------|---------------|------------|------------------------|------------------|
| T.1     | (P.1)   | 4             | 3             | silky      | Yes                    | 8                |
| T.2     | (P.2)   | 2.5           | 1.5           | silky      | Yes                    | 6                |
| T.4     | (P.4)   | 3             | 2.5           | silky      | Yes                    | 9                |
| T.5     | (P.5)   | 4             | 3             | silky      | Yes                    | 7                |
| T.6     | (P.6)   | 4             | 3             | silky      | Yes                    | 7                |
| T.8     | (P.8)   | 4             | 3             | silky      | Yes                    | 8                |
| T.9     | (P.9)   | 3.5           | 3             | silky      | Yes                    | 8                |
| T.10    | (P.10)  | 4             | 3             | silky      | Yes                    | 8                |
| T.11    | (P.11)  | 3             | 2.5           | slippery   | Yes                    | 11               |
| T.12    | (P.12)  | 3             | 2.5           | slippery   | Yes                    | 12               |
| C-T.13  | (A.2)   | 7             | 7             | rough      | No                     | 10               |
| C-T.14  | U.S. Pat. No. 4,247,592 | 5.5 | 4.5 | slippery | No | 17 |
| C-T.15  | none    | 8             | 8             | rough      | —                      | 8                |

U.S. Pat. No. 4,247,592: refers to the polymer from U.S. Pat. No. 4,247,592, Ex. 1.

The invention claimed is:

1. A polymer bearing the following structural elements per molecule:
   (A) an average of at least two alkoxylated (poly)alkylenimine units, said alkylene being selected from $C_2$-$C_{10}$-alkylene and said alkoxylation being selected from ethoxylation, propoxylation, butoxylation and combinations of at least two of the foregoing,
   (B) at least one polysiloxane unit, and
   (C) at least one linkage connecting at least two different alkoxylated (poly)alkylenimine units (A) bearing at least one polysiloxane unit (B), each linkage (C) being selected from organic spacers bearing in the range of from 4 to 30 carbon atoms.

2. The polymer according to claim 1 wherein such alkoxylated (poly)alkylenimine (A) is selected from poly-ethoxylated polyethylenimine, ethoxylated polypropylenimine, ethoxylated polyhexanamines, ethoxylated and propoxylated polyethylenimine, ethoxylated and propoxylated polypropylenimine, and ethoxylated and poly-propoxylated α,ω-hexanediamines.

3. The polymer according to claim 1 having an average molecular weight $M_w$ in the range of from 2,500 to 1,500,000 g/mol.

4. The polymer according to claim 1 wherein linkage (C) is selected from a diester spacer and a diurethane spacer.

5. The polymer according to claim 1 wherein the polydispersity Q of polyalkoxylated (poly)alkylenimine (A) is in the range of from 2 to 15.

6. The polymer according to claim 1 wherein linkage (C) is selected from a terephthalic acid diester linkage, an isophthalic acid diester linkage, an adipic acid diester linkage, a cyclohexanedicarboxylic acid diester linkage, and a diurethane linkage based on toluylene diisocyanate, hexamethylene diisocyanate, and (4,4'-diisocyanatophenyl)methylene.

7. The polymer according to claim 1 wherein said polysiloxane unit (B) bears at least 10 O—Si($R^1R^2$)- units, with $R^1$ and $R^2$ being different or identical and selected from $C_1$-$C_{10}$-alkyl, phenyl, benzyl and $C_5$-$C_8$-cycloalkyl.

8. The polymer according to claim 1 containing an average in the range of from 3 to 15 alkoxylated (poly)alkylenimine units (A) per molecule.

9. A process for making a polymer according to claim 1, said process comprising
   (a) providing an alkoxylated (poly)alkylenimine (A),
   (b) reacting said alkoxylated (poly)alkylenimine (A) with at least one α,ω-dihydroxy polysiloxane, and
   (c) reacting the product according to step (b) with at least one compound bearing at least two functional groups per molecule that are reactive towards alkanol groups.

10. The process according to claim 9 wherein said compound bearing at least two functional groups per molecule is selected from terephthalic acid dimethyl ester, terephthalic acid diethyl ester, isophthalic acid dimethyl ester, isophthalic acid diethyl ester, cyclohexanedicarboxylic acid dimethyl ester, cyclohexanedicarboxylic acid diethyl ester, toluylene diisocyanate, hexamethylene diisocyanate, and 4,4'-methylenebis(phenyl isocyanate).

11. The process according to claim 9 wherein step (c) is performed in the presence of a catalyst.

12. A method for the manufacture of a leather or textile comprising treating a semi-finished product tanned with a chrome tanning agent, a mineral tanning agent, a polymer tanning agent, an aldehyde, a syntan, or resin tanning agent with a polymer according to claim 1.

13. A method of coating concrete or bricks comprising applying a polymer according to claim 1 to the concrete or bricks.

14. A method for the manufacture of a textile comprising treating the textile with a polymer according to claim 1.

* * * * *